Oct. 18, 1932.　　M. J. KERMER　　1,883,379
EVAPORATOR
Filed Aug. 30, 1930　　2 Sheets-Sheet 1

Inventor
Martin J. Kermer
By Popp & Powers
Attorneys

Oct. 18, 1932. M. J. KERMER 1,883,379
EVAPORATOR
Filed Aug. 30, 1930   2 Sheets-Sheet 2
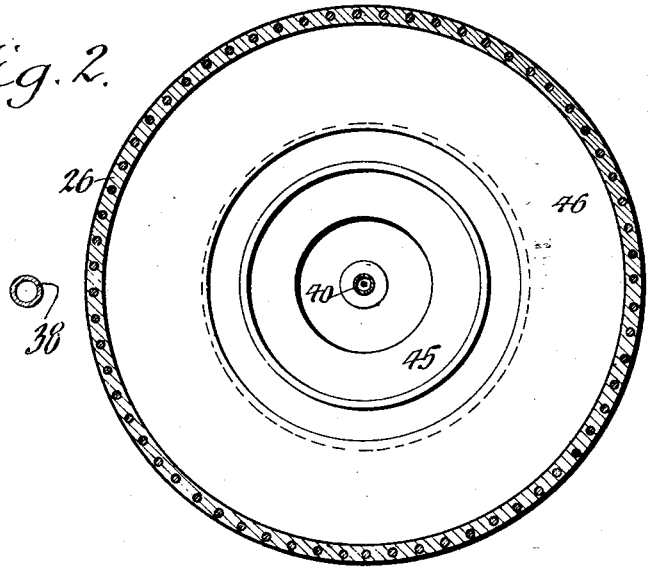
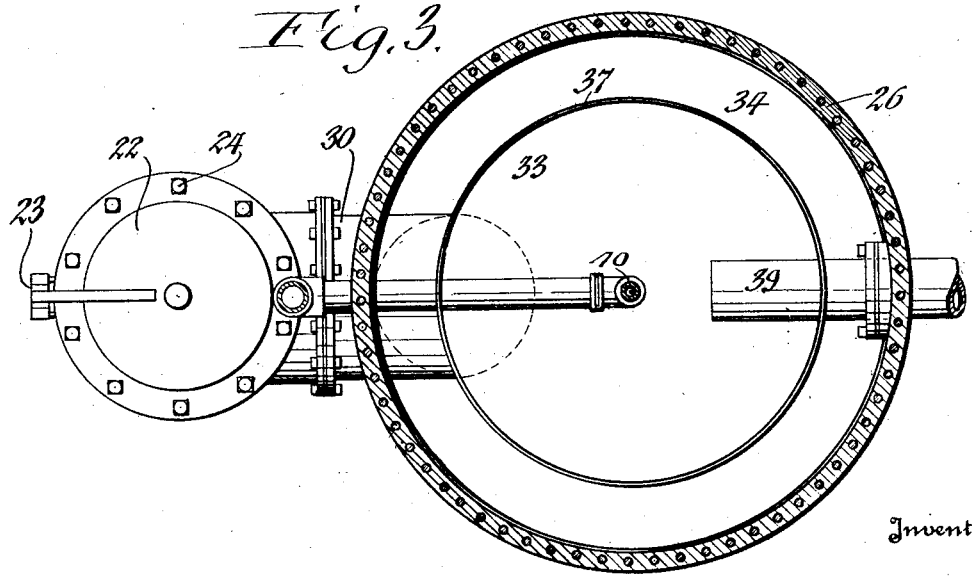
Inventor
Martin J. Kermer
By Popp & Powers
Attorneys Patented Oct. 18, 1932

1,883,379

UNITED STATES PATENT OFFICE

MARTIN J. KERMER, OF SNYDER, NEW YORK, ASSIGNOR TO BUFFALO FOUNDRY & MACHINE COMPANY, OF BUFFALO, NEW YORK, A CORPORATION OF NEW YORK

EVAPORATOR

Application filed August 30, 1930. Serial No. 479,048.

This invention relates to an evaporator for increasing the density of liquids containing solid contents, such as milk, and has for its object the provision of an apparatus of this character which is comparatively simple in construction and all parts of the same are easy of access for inspection, cleaning and repairing, and which is so organized that all parts of the vapor are compelled to pass through a shower of water so as to uniformly and effectively condense the vapors rapidly and economically and thus increase the capacity of the apparatus and reduce the cost of the evaporating operation.

In the accompanying drawings:—

Figures 2 and 3 are horizontal sections taken on lines 2—3 Fig. 1, and looking upwardly and downwardly respectively.

In the following description similar characters of reference indicate like parts in the several figures of the drawings.

Figure 1:
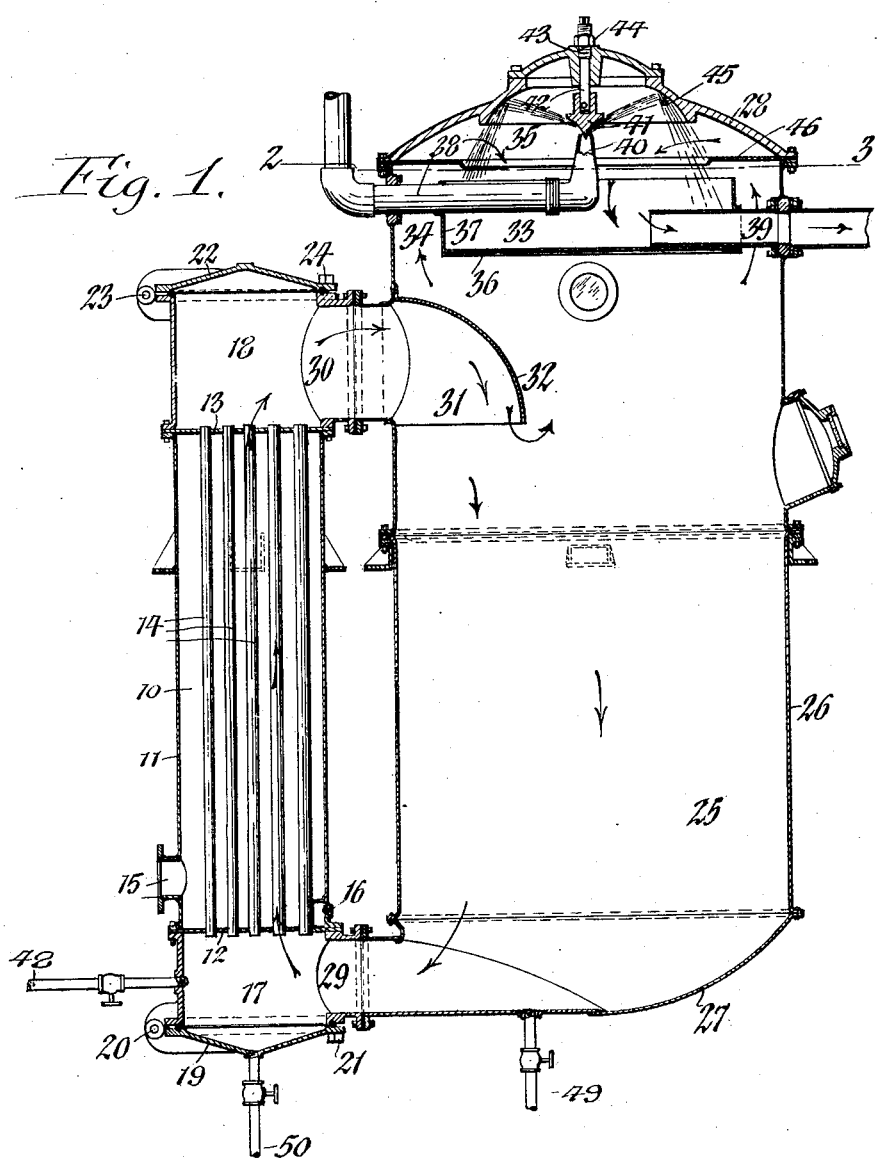
Figure 1 is a vertical section of an evaporator embodying my improvements.

In its general organization the evaporator comprises heating means for heating the solid laden liquid which is to be concentrated to increase the density thereof, separating means which receive the heated concentratable liquid from said heating means and in which the vapor is separated from the liquid, and condensing means for condensing the vapors which have been separated from the liquid under concentration.

The heating means may be of various forms but that shown in the drawings as an example suitable for the present purpose is constructed as follows:

The numeral 10 represents the heating chamber which is provided with an upright cylindrical body or side wall 11, a lower tube sheet or head 12, an upper tube sheet or head 13, and a plurality of upright heating tubes or pipes 14 connected at their lower and upper ends with said lower and upper tube sheets, respectively. These tubes are heated on their exterior for heating the liquid to be concentrated within these tubes, this being preferably accomplished by utilizing steam as the heating medium, which latter is introduced into the heating chamber through an inlet 15 at the lower end thereof while the water of condensation is discharged through an outlet 16 also at the lower end of the heating chamber, as shown in Fig. 1.

The lower ends of the tubes open into a lower liquid inlet chamber or manifold 17 which supplies the liquid to be concentrated thereto and the upper ends of these tubes open into an upper outlet chamber or manifold 18 which receives the heated liquid and vapor issuing from the upper ends of the tubes upon being heated by the steam surrounding the latter.

The bottom 19 of the inlet chamber is movably connected therewith by a hinge 20 at one edge and a bolt 21 at the opposite edge thereof, and the top 22 of the outlet chamber is movably connected therewith by a hinge 23 at one edge and a bolt 24 at the opposite edge, as shown in Fig. 1. Upon opening both the bottom of the lower or inlet chamber and the top of the outlet chamber the heating tubes are accessible at both ends for cleaning, inspecting and repairing.

The lower and upper manifold chambers of the heating apparatus cooperate with the means for separating the vapor from the unvaporized liquid which is to be concentrated, which separating means are constructed as follows:

The numeral 25 represents an upright separating and storing chamber having an upright cylindrical side wall 26, a downwardly dished bottom 27, and an upwardly dished top 28. At its lower end the separating chamber is connected by a return pipe 29 with the lower inlet chamber 17 and its upper part is connected on one side thereof with the upper or outlet chamber 18 of the heating apparatus by a transfer pipe 30. The vapor and heated liquid issuing from the upper ends of the heating tubes are conducted from the upper chamber 18 by the transfer pipe 30 into the upper part of the separating chamber by a hood 31 arranged within the separating chamber and communicating at its side with the transfer tube 30 and having a downwardly curved inner wall 32 which directs the vapor and heated liquid downwardly through the outlet on the underside of the hood and into the separating chamber. As the vapor and heated liquid issue from the underside of the hood the liquid continues its downward movement into the lower part of the separating chamber and is then conducted by the return pipe 29 into the lower chamber 17 preparatory to again passing upwardly through the heating tubes for continuing the operation of heating the liquid to be concentrated.

The vapor which is discharged from the underside of the hood separates from the liquid accompanying the same and passes upwardly around the lower edge of the hood into the upper part of the separating chamber and is then operated upon by the means which prevent or at least reduce to a minimum entrainment therein of any of the liquid which is being concentrated, also condensing this vapor before the same leaves the separating chamber.

The means for recovering liquid entrained in the vapor and condensing the latter are constructed as follows:

Within the upper part of the separating chamber is arranged a catch basin or pan 33 which is spaced from the side wall of the separating chamber by an annular passage 34 and also spaced from the top of this chamber by a dome 35 formed within the upper part of the same. This basin is preferably of circular form and has a flat bottom 36 and an upright side wall 37 terminating short of the top of the separating chamber and the same may be supported in any suitable manner, as for example by pipes or tubes 38, 39 which are connected with the adjacent part of the side wall of the separating chamber and form part of the means whereby the vapors are condensed and the condensate is carried away from the separating chamber, as will later appear.

The vapor condensing means include the pipe 38 which is connected at its outer end with a source of water supplied under pressure and a discharge nozzle 40 connected with the inner end of the pipe 38 and having its outlet projecting upwardly from a point over the central part of the basin. As the stream of water issues upwardly from the nozzle it strikes a spreader 41 which causes the same to be spread out into the form of an upwardly enlarging cone toward the top of the separating chamber. This spreader preferably has the form of a downwardly tapering plug and it is adjustable toward and from the nozzle for the purpose of regulating the size of the spray by means of an upright adjusting rod 42 having its lower end connected with the spreader and provided at its upper end with a screw threaded portion 43 which extends to the exterior of the separating chamber and works in a correspondingly threaded opening in the top of the separating chamber.

After adjustment the spreader is held in position by a clamping nut 44 arranged on the outer end of the rod and engaging with the outer side of the top 28.

On the underside of the top of the separating chamber a concave deflector 45 is provided against which the conical spray of water impinges which issues from between the nozzle and the spreader and is thereby directed downwardly in the form of an annular shower which flares downwardly and discharges into catch basin 33 adjacent to the inner side of the wall thereof and between the passage 34 and the inner end of the outlet pipe 39, as indicated in Fig. 1.

An exhausting effect is produced in the separating chamber and the catch basin by connecting the outer end of the outlet pipe 39 with a wet vacuum pump or other suitable device which accomplishes this purpose, whereby the vapors separated from the liquid under concentration are drawn from the hood 31 upwardly in the separating chamber, through the annular passage 34 and downwardly into the catch basin toward said outlet pipe 39. During this course of the vapors the same strike the underside of the catch basin which operates to deflect the same laterally outward in all directions from the center of the separating chamber toward the annular passage 34 between the wall of the basin and the wall of the separating chamber, thereby causing further separation of any of the liquids to be concentrated from the vapors, and reducing the possibility of any solids bearing liquid in said vapor, whereby the loss of such liquids is reduced to a minimum and the yield of concentrated liquid is increased accordingly.

As the vapors issue from the upper end of the annular passage 34 the same move inwardly toward the center of the dome 35 and downwardly toward the center of the basin and the inner end of the outlet pipe and in doing so these vapors pass through the falling shower of water, whereby the vapors are mingled with this water shower and become condensed and drop as liquid with the water into the basin.

From the latter the mixed water and condensed vapors are discharged through the outlet pipe 39.

In order to prevent the shower of water from reaching outside of the basin and also to direct the vapors immediately inwardly toward this shower upon issuing from the upper end of the annular passage 34, an annular baffle 46 is arranged within the dome 35 and extends from the wall of the separating chamber inwardly over the marginal part of the catch basin. The inner edge of this baffle is arranged a sufficient distance inwardly from the upper edge of the basin wall so as to cut off any part of the water shower which otherwise would reach beyond the periphery of the basin, thereby preventing any condensing water from being directed into the annular passage 34 and mixing with the liquid to be concentrated in the separating chamber.

Due to the spreading effect of the underside of the basin on the vapors rising from the hood 31 and the approach of these vapors toward the shower of water from the outer side of this shower, a maximum exposure of the vapor mass to the water mass is obtained, whereby greater uniformity in the action of the water on the vapors is obtained and a greater amount of vapor condensation is obtained for a given size of apparatus and quantity of water used, thereby enabling such work to be done with greater economy.

The apparatus is supplied with the liquid to be condensed by a pipe 48 which preferably leads into the lower manifold chamber 17, and when the apparatus is used to condense liquid in batches then the concentrated liquid is withdrawn from the lower end of the inlet chamber 17 through a pipe 50, but when the concentration of liquids proceeds continuously then the concentrated liquid is withdrawn from the lower end of the separating chamber through a pipe 49.

When this apparatus is in operation a considerable quantity of the liquid to be concentrated is present in the chamber 25 so that the same, in effect, also serves as a storing chamber for such liquid, the latter being withdrawn from the lower end of this chamber and supplied to the lower ends of the heating tubes and the unevaporated liquid issuing from the upper ends of the tubes being again delivered into this chamber below its vapor outlet.

I claim as my invention:

1. An evaporator comprising a separating and storing chamber adapted to receive the concentratable liquid and having a vapor outlet at its upper part, a catch basin arranged in the upper part of the separating chamber and connected with said outlet and separated from the side wall of the chamber by an intervening annular passage through which the vapors pass from the lower part of said chamber and toward the top of said basin; means for delivering an annular shower of condensing liquid so that the same passes from the top of said chamber into the top of said basin between said annular passage and said outlet; and including a downwardly projecting spreader for condensing liquid arranged centrally over the basin, and an upwardly projecting nozzle for directing a stream of condensing liquid against said spreader and causing an annular shower of said liquid to fall into said basin.

2. An evaporator comprising a separating and storing chamber adapted to receive the concentratable liquid and having a vapor outlet at its upper part, a catch basin arranged in the upper part of the separating chamber and connected with said outlet and separated from the side wall of the chamber by an intervening annular passage through which the vapors pass from the lower part of said chamber and toward the top of said basin; and means for delivering an annular shower of condensing liquid so that the same passes from the top of said chamber into the top of said basin between said annular passage and said outlet, and including a nozzle for directing a stream of condensing liquid upwardly at the central part of said basin, a spreader arranged above said nozzle and adapted to spread the stream of liquid issuing from said nozzle laterally in the form of a conical spray; and a deflector arranged at the top of said chamber and adapted to deflect said spray downwardly into said basin in the form of an annular shower.

3. An evaporator comprising a separating and storing chamber adapted to receive the concentratable liquid and having a vapor outlet at its upper part, a catch basin arranged in the upper part of the separating chamber and connected with said outlet and separated from the side wall of the chamber by an intervening annular passage through which the vapors pass from the lower part of said chamber and toward the top of said basin; means for delivering an annular shower of condensing liquid so that the same passes from the top of said chamber into the top of said basin between said annular passage and said outlet; and including a nozzle for directing a stream of condensing liquid upwardly at the central part of said basin, a spreader arranged above said nozzle and adapted to spread the stream of liquid issuing from said nozzle laterally in the form of a conical spray; a deflector arranged at the top of said chamber and adapted to deflect said spray downwardly into said basin in the form of an annular shower; and an annular baffle arranged above said passage and projecting from the side of said chamber inwardly over the marginal part of said basin.

4. An evaporator comprising an upright separating and storing chamber adapted to receive the concentratable liquid and having a vapor outlet in the upper part of its side, an annular catch basin arranged centrally in the upper part of said chamber and separated from the side thereof by an intervening passage, and communicating with said outlet, and shower means for producing an annular shower of condensing liquid which falls from the top of said chamber into said basin between said passage and said outlet, which shower means include a nozzle arranged centrally above the basin and having an upwardly turned outlet for delivering a stream of condensing liquid toward the top of the chamber, a conical spreader arranged above the outlet of said nozzle, and means for adjusting said spreader relatively to said nozzle.

5. An evaporator comprising an upright separating and storing chamber adapted to receive the concentratable liquid and having a vapor outlet in the upper part of its side, a circular catch basin arranged centrally in the upper part of said chamber and separated from the side thereof by an intervening passage and communicating with said outlet, and shower means for producing an annular shower of condensing liquid which falls from the top of said chamber into said basin between said passage and said outlet, which shower means include a nozzle arranged centrally above the basin and having an upwardly turned outlet for delivering a stream of condensing liquid toward the top of the chamber, a conical spreader arranged above the outlet of said nozzle and means for adjusting said spreader relatively to said nozzle, including an adjusting rod connected at its lower end with said spreader and having a screw connection at its upper end with the top of said chamber.

In testimony whereof I hereby affix my signature.

MARTIN J. KERMER.